(12) United States Patent
Carroll

(10) Patent No.: US 7,538,289 B2
(45) Date of Patent: May 26, 2009

(54) MULTIPLE POSITION SWIVEL LAMP WITH INTEGRAL SWITCH CONTACTS

(75) Inventor: Tom Carroll, Trabuco Canyon, CA (US)

(73) Assignee: Bal Seal Engineering Co., Inc., Lake Forest, CA (US)

( * ) Notice: Subject to any disclaimer, the term of this patent is extended or adjusted under 35 U.S.C. 154(b) by 532 days.

(21) Appl. No.: 11/278,384

(22) Filed: Mar. 31, 2006

(65) Prior Publication Data

US 2006/0221624 A1  Oct. 5, 2006

Related U.S. Application Data

(60) Provisional application No. 60/668,308, filed on Apr. 5, 2005.

(51) Int. Cl.
*H01H 19/46* (2006.01)

(52) U.S. Cl. ........ 200/519; 200/277

(58) Field of Classification Search ....... 200/51.07, 200/51.12, 61.51, 61.52, 277; 362/227, 287, 362/427, 404; 439/6, 13, 17, 19, 110, 117

See application file for complete search history.

(56) References Cited

U.S. PATENT DOCUMENTS

| 3,594,528 | A | * | 7/1971 | Viau | 200/314 |
| 5,645,147 | A | * | 7/1997 | Kovacik et al. | 191/12.2 R |
| 6,034,614 | A | * | 3/2000 | Haley | 340/690 |
| 6,170,967 | B1 | * | 1/2001 | Usher et al. | 362/394 |

\* cited by examiner

*Primary Examiner*—Michael A Friedhofer
*Assistant Examiner*—Lisa N Klaus
(74) *Attorney, Agent, or Firm*—Walter A. Hackler

(57) ABSTRACT

A multiple positioning assembly with integral switch contact includes a cylindrical housing along with a ball assembly including a ball portion received by the cylindrical assembly. The ball portion includes an electrically conductive surface and a neck extending therefrom. A plurality of spaced apart spring retainers are disposed within the cylindrical housing with electrically conductive coil spring contacts therein. Adjacent spring contacts complete an electrical circuit through the ball portion surface when in simultaneous contact therewith. Spring contacts further enable positioning of the ball portion within the cylindrical housing for conical movement of the neck with the ball portion being axially moveable between the spring contacts.

24 Claims, 2 Drawing Sheets

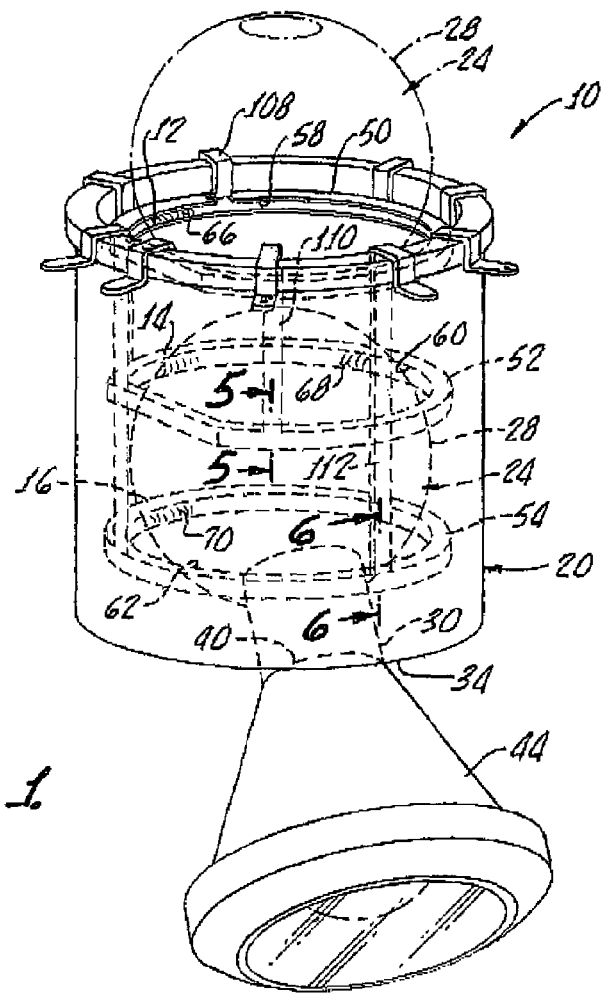
Fig. 1
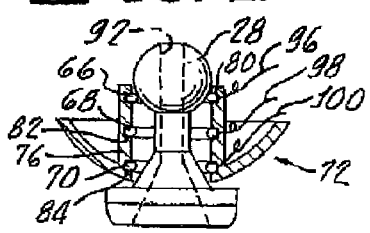
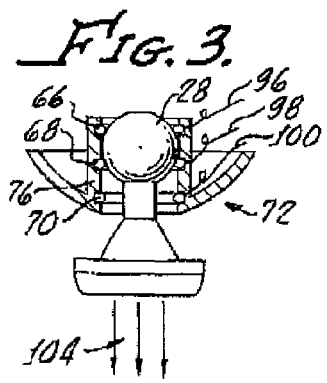
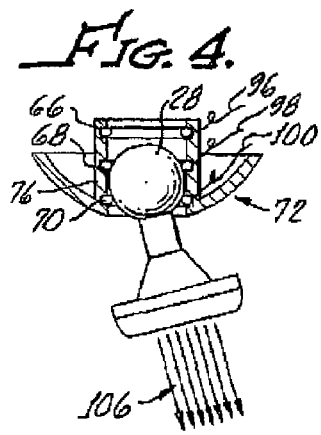

MULTIPLE POSITION SWIVEL LAMP WITH INTEGRAL SWITCH CONTACTS

The present application claims priority from the U.S. Provisional Patent Application, Ser. No. 60/668,308 filed Apr. 5, 2005, which is to be incorporated herein in its entirety including all specification and drawings.

The present invention generally relates to ball and socket type swivel assemblies and is more particularly directed to multiple positioning assemblies for lamps and air conditioning nozzles which may be used in automobiles or equivalent applications which require a source of illumination which can be panned in a conical field of projection or directing the stream of cooled air. The assembly utilizes radial and axial canted coil springs which physical retain a swivel ball and also provide electrical context used in a power switch for controlling the lamp or air conditioning flow.

SUMMARY OF THE INVENTION

A multiple positioning assembly with integral switch contacts in accordance with the present invention generally includes a cylindrical housing along with a ball assembly including a ball portion received by the cylindrical housing. The ball portion includes an electrically conductive surface and a neck extending therefrom with a bore through the neck and ball portion.

A plurality of spaced apart retainers are disposed within the cylindrical housing with each being retainer having a groove open toward the ball portion. Alternatively, grooves may be formed into the cylindrical housing for supporting electrically conductive coil spring contacts.

Adjacent spring contacts complete an electrical circuit through the ball portion surface when in simultaneous contact therewith and further the springs enable positioning of the ball within the cylinder housing for conical movement of the neck with the ball portion being axially moveable between the spring contacts.

A groove/spring contacts most proximate to an end of the cylindrical housing enables insertion of the ball portion therepast into the cylindrical housing but prevents withdrawal of the ball portion from the cylindrical housing.

More particularly, in the embodiment utilizing a spring retainer, such retainers may be suspended from an end of the cylindrical housing. In order to prevent rotation of the ball portion within the housing, the ball portion may be oblate or include a flat, or level portion.

In one embodiment of the present invention, air nozzle may be disposed at an end of the neck and in fluid communication with the bore through the neck and ball portion.

Alternatively, the assembly may further include a lamp socket, preferably a three-way lamp socket, disposed at an end of the neck which is in electrical contact with the spring contacts which, in turn, provides control and power for lamp intensity dependent upon the axial, or lateral, position of the ball portion within the cylindrical housing.

Increased spring force against the ball portion as may be desired may be provided through the use of a compressed groove portion.

BRIEF DESCRIPTION OF THE DRAWINGS

The advantages and features of the present invention will be better understood by the following description when considered in conjunction with the accompanying drawings, in which:

FIG. 1 is a perspective view of a multiple positioning assembly with integral switch contacts in accordance with the present invention partially broken away and showing a cylindrical housing, a ball assembly with a ball portion received by the cylindrical housing, a plurality of spaced apart retainers, coil spring contacts disposed in each retainer groove and a lamp socket disposed at an end of the ball assembly neck;

FIGS. 2, 3, and 4 illustrate another embodiment of the present invention in which the spring contacts are disposed in cylindrical wall grooves and a nozzle is disposed at an end of a ball assembly neck, the nozzle being in fluid communication through a bore through the neck and ball portion, which in turn may be interconnected to an air conditioning/heater unit, not shown;

DETAILED DESCRIPTION

Figure 5:
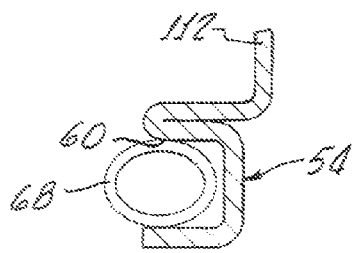
FIG. 5 is a cross sectional view taken along the line 5-5 of FIG. 1 illustrating a coil spring contact disposed in a groove for enabling passage of the ball portion therepast.

With reference to FIG. 1, there is shown a multiple positioning assembly 10 with an integral switch contacts 12, 14, 16 which generally includes a cylindrical housing 20 along with the ball assembly 24 which includes a ball portion 28 received by the cylindrical housing 20 through an opening 34 with the neck 30 extending therefrom.

The ball portion 28 includes an electrical conductive surface for making contact with the switch contacts 12, 14, 16. In the embodiment 10 shown in FIG. 1, a lamp socket 38, preferably a conventional three-way lamp socket, is disposed at an end 40 for removably supporting a lamp fixture 44 in a conventional manner.

The switch contacts 12, 14, 16 include three spaced apart spring retainers 50, 52, 54 respectively, each having grooves 58, 60, 62 for supporting spring contacts 66, 68, 70.

As diagramed in FIGS. 2, 3, and 4 of a separate embodiment, adjacent spring contacts complete an electrical circuit through the ball portion 28 surface during simultaneous contact therewith and the springs also enable positioning the ball portion within a cylindrical housing 76 for enabling conical movement of the neck 30, as illustrated in FIG. 4. Common referenced characters indicate identical or substantially similar components of the different embodiments 10, 72 herein described.

In the embodiments 72, grooves 80, 82, 84 supports the springs 66, 68, 70.

In the embodiment 72, a nozzle is disposed at the neck end 40 which communicates with a bore 92 extending through the neck 30 and ball portion 28 to an external source of air, not shown.

The spring contacts 66, 68, 70 are interconnected by wires 96, 98, 100 to a controller (also not shown) for the air supply.

In FIG. 2, the ball portion 28 does not simultaneously contact any of the spring contacts 66, 68, 70 and accordingly is an off and retracted position.

In FIG. 3, the ball portion 28 is disposed between the contact 66, 68 enabling a low speed, lower operation, as indicated by the arrows 104.

FIG. 4, in which the ball portion 26 is disposed between the spring contacts 68, 70 provides through wires 98, 100 a signal to the controller for providing a higher fluids indicated by the arrows 106.

This operation is similar to the three-way light control of embodiment 10.

With reference again to FIGS. 1 and 5, the retainers 50, 52, 54 suspend the spring 66, 68, 70 in a spaced apart relationship within the cylinder 20, as shown in FIG. 1, with the retainers being supported by dependent arms 108, 110, 112. The grooves 58, 60 with spring 66, 68 enable passage of the ball portion 28 therepast in either direction, a cross sectional view of the groove 60 being shown in FIG. 5.

Figure 6:
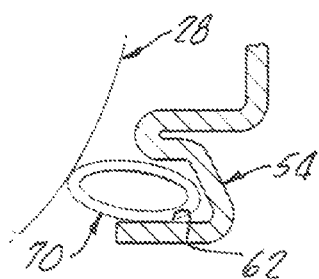
FIG. 6 is a cross sectional view of a groove taken along the line 6-6 of FIG. 1 illustrating a spring/groove configuration enabling entry of the ball portion into the cylindrical housing but preventing withdrawal therefrom.

However, the groove 62 retaining the spring contact 70 enables passage of the ball portion 28 into the cylindrical housing 20 but prevents withdrawal of the ball portion 28 from the cylindrical housing 20 by providing a lock against a motion, as illustrated in FIG. 6. Various spring/groove arrangements may be utilize for providing the function herein described. Such spring/groove arrangement are well known and described, as for example, in U.S. Pat. Nos. 4,974,821, 5,139,276, 5,082,390, 5,545,842, and 5,411,348 to Ballsells. All of these patents are to be incorporated herewith by this specific reference thereto for the purpose of describing suitable groove and spring configurations for enabling passage and lockage of the ball member 28 within the housing 20.

Figure 7:
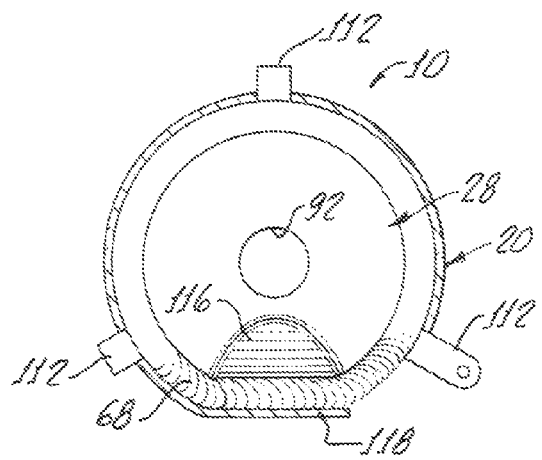
FIG. 7 is a cross sectional view taken along the line 7-7 of FIG. 1 illustrating a flat barrier on the ball portion for preventing rotation of the ball portion and assembly within the cylinder.
Figure 8:
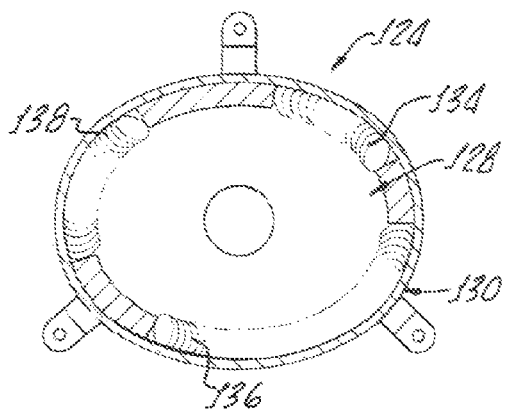
FIG. 8 is an alternative embodiment of the present invention in which rotation of the ball assembly within the cylinder is prevented through the utilization of an oblate ball portion.

As shown in a cross sectional view of FIG. 7, the ball portion 20 may include a flat 116 with a corresponding linear portion 118 in the cylinder 20 in order to prevent rotation of the ball portion 28 within the cylinder 20. Also shown in FIG. 7, the spring 68 is a continuous garter-type spring. An alternative embodiment 124 for preventing the rotation of the ball utilizes an oblate ball 128 disposed in an oval cross section cylinder 30 along with spring segments 134, 136, 138. The operation of embodiment 124 is identical to that hereinabove described in connection with the embodiments 10 and 72.

Figure 9:
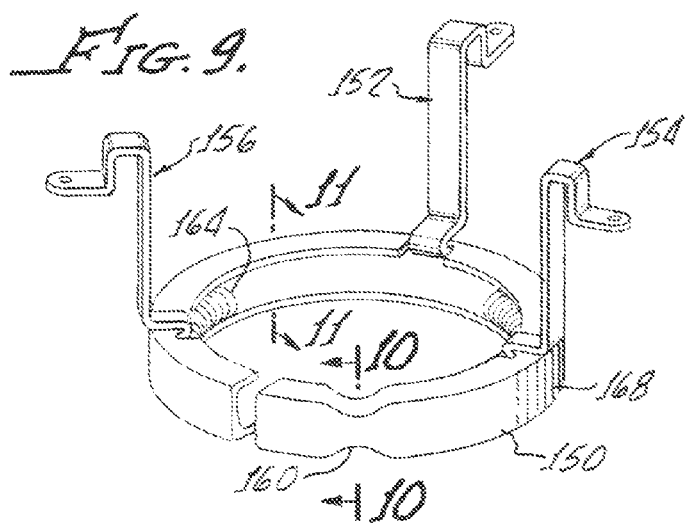
FIG. 9 is a perspective view of a spring retainer including a compressed groove portion.
Figure 10:
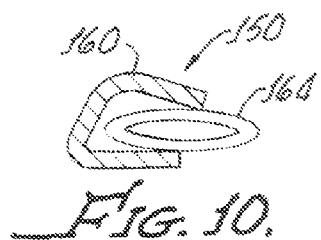
FIG. 10 is a sectional view taken along the line 10-10 of FIG. 9 illustrating the compressed groove portion with the spring extending therefrom for inserting added force to the ball assembly, as will be hereinafter described in greater detail.
Figure 11:
FIG. 11 is a cross sectional view taken along the line 11-11 of FIG. 9 illustrating an uncompressed section of the spring retainer groove.

With reference to FIGS. 9-11, further spring retention control may be provided by utilizing a spring retainer 150 with depending arms 152, 154, 156 similar to the retainers 50, 52, 54 hereinabove described except that a compressed groove portion 160 is provided which compresses a spring contact 164 therein along a radial direction, as illustrated in FIG. 10. Comparison may be made with the spring 164 in non-compressed portions 168, see FIGS. 10 and 11. The compressed spring 164 provides increased spring forced against the ball portion 28 for both stabilization of the ball portion at various conical positions within the cylinder 20. Again, groove and spring configurations are described as set forth in the hereinabove referenced incorporated patents.

Although there has been hereinabove described a specific multiple position swivel lamp with integral switch contacts in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A multiple positioning assembly with integral switch contacts, the assembly comprising:
    a cylindrical housing;
    a ball assembly including a ball portion received by said cylindrical housing, said ball portion having an electrically conductive surface and including a neck extending therefrom with a bore through said neck and ball portion;
    a plurality of spaced apart spring retainers disposed within said cylindrical housing, each spring retainer having a groove open toward said ball portion;
    an electrically conductive spring contact disposed in each groove;
    adjacent spring contacts completing an electrical circuit through the ball portion surface when in simultaneous contact therewith and enabling positioning said ball portion within said cylindrical housing for conical movement of said neck, said ball portion being axially moveable between spring contacts; and
    one of the spring contacts most proximate to an end of said cylindrical housing preventing withdrawal of said ball portion from said cylindrical housing.

2. The assembly according to claim 1 wherein the spring retainer are molded into an inside wall of the housing.

3. The assembly according to claim 1 the spring retainer are suspended from an end of said cylindrical housing.

4. The assembly according to claim 1 wherein said ball portion is oblate.

5. The assembly according to claim 1 wherein said ball portion includes a flat.

6. The assembly according to claim 1 further comprises an air nozzle at an end of said neck and in communication with the bore through said neck and ball portion.

7. The assembly according to claim 1 further comprises a lamp socket disposed at an end of said neck and in electrical contact with said spring contact.

8. The assembly according to claim 1 further comprises a three way lamp socket disposed at an end of said neck and in electrical contact with said spring contacts.

9. The assembly according to claim 1 wherein at least one of the spring retainers has a compressed groove portion locally increasing spring force against the ball portion.

10. The assembly according to claim 1 wherein the coil spring is segmented.

11. A multiple positioning assembly with integral switch contacts, the assembly comprising:
    a cylindrical housing;
    a ball assembly including a ball portion received by said cylindrical housing, said ball portion having an electrically conductive surface and including a neck extending therefrom with a bore through said neck and ball portion;
    three spaced apart spring retainers disposed within said cylindrical housing, each spring retainer having a groove open toward said ball portion;
    an electrically conductive spring contact disposed in each groove;

adjacent spring contacts completing an electrical circuit through the ball portion surface when in simultaneous contact therewith and enabling positioning said ball portion within said cylindrical housing for conical movement of said neck, said ball portion being axially moveable between spring contacts;

one of the spring contacts most proximate to an end of said cylindrical housing preventing withdrawal of said ball portion from said cylindrical housing; and a three way lamp socket disposed at an end of said neck and in electrical contact with said spring contacts.

12. The assembly according to claim 11 wherein the spring retainer are molded into an inside wall of the housing.

13. The assembly according to claim 11 the spring retainer are suspended from an end of said cylindrical housing.

14. The assembly according to claim 11 wherein said ball portion is oblate.

15. The assembly according to claim 11 wherein said ball portion includes a flat.

16. The assembly according to claim 11 wherein at least one of the spring retainers has a compressed groove portion locally increasing spring force against the ball.

17. The assembly according to claim 11 wherein the coil spring portion is segmented.

18. A multiple positioning assembly with integral switch contacts, the assembly comprising:

a cylindrical housing;

a ball assembly including a ball portion received by said cylindrical housing, said ball portion having an electrically conductive surface and including a neck extending therefrom with a bore through said neck and ball portion;

a plurality of spaced apart spring retainers disposed within said cylindrical housing, each spring retainer having a groove open toward said ball portion;

an electrically conductive spring contact disposed in each groove;

adjacent spring contacts completing an electrical circuit through the ball portion surface when in simultaneous contact therewith and enabling positioning said ball portion within said cylindrical housing for conical movement of said neck, said ball portion being axially moveable between spring contacts;

one of the spring contacts most proximate to an end of said cylindrical housing preventing withdrawal of said ball portion from said cylindrical housing; and an air nozzle at an end of said neck communicating with the bore through said neck and ball portion.

19. The assembly according to claim 18 wherein the spring retainer are molded into an inside wall of the housing.

20. The assembly according to claim 18 the spring retainer are suspended from an end of said cylindrical housing.

21. The assembly according to claim 18 wherein said ball portion is oblate.

22. The assembly according to claim 18 wherein said ball portion includes a flat.

23. The assembly according to claim 18 wherein at least one of the spring retainers has a compressed groove portion locally increasing spring force against the ball portion.

24. The assembly according to claim 18 wherein the coil spring is segmented.

* * * * *